(12) United States Patent
Ichikawa et al.

(10) Patent No.: US 12,155,276 B2
(45) Date of Patent: Nov. 26, 2024

(54) ELECTRIC POWER STEERING APPARATUS

(71) Applicant: Mitsubishi Electric Corporation, Tokyo (JP)

(72) Inventors: Takanori Ichikawa, Tokyo (JP); Kengo Fujimoto, Tokyo (JP); Takahisa Kawaguchi, Tokyo (JP); Kentaro Urimoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 653 days.

(21) Appl. No.: 17/050,506

(22) PCT Filed: Aug. 24, 2018

(86) PCT No.: PCT/JP2018/031310
§ 371 (c)(1),
(2) Date: Oct. 26, 2020

(87) PCT Pub. No.: WO2020/039572
PCT Pub. Date: Feb. 27, 2020

(65) Prior Publication Data
US 2021/0075301 A1    Mar. 11, 2021

(51) Int. Cl.
*H02K 3/28*   (2006.01)
*B60R 16/03*  (2006.01)
(Continued)

(52) U.S. Cl.
CPC ............. *H02K 11/33* (2016.01); *B60R 16/03* (2013.01); *B62D 5/046* (2013.01); *H02K 3/28* (2013.01);
(Continued)

(58) Field of Classification Search
CPC . H02K 11/33; H02K 3/28; H02K 3/50; H02K 2211/03; H02K 2213/06;
(Continued)

(56) References Cited

U.S. PATENT DOCUMENTS

2002/0060105 A1   5/2002  Tominaga et al.
2011/0066332 A1   3/2011  Sonoda et al.
(Continued)

FOREIGN PATENT DOCUMENTS

CN   103987611 A   8/2014
CN   107074268 A   8/2017
(Continued)

OTHER PUBLICATIONS

Notice of Reasons for Refusal dated Nov. 2, 2021 from the Japanese Patent Office in Japanese Application No. 2020-537985.
(Continued)

*Primary Examiner* — Eric Johnson
(74) *Attorney, Agent, or Firm* — Sughrue Mion, PLLC; Richard C. Turner

(57) ABSTRACT

There is provided an electric power steering apparatus in which constituent elements of a control unit for controlling one of 2 winding groups of a motor and constituent elements of a control unit for controlling the other one thereof are arranged in point symmetry with respect to a center axis of an output shaft or in line symmetry with respect to a virtual straight line perpendicular to a direction in which the output shaft extends.

20 Claims, 7 Drawing Sheets

(51) Int. Cl.
  *B62D 5/04* (2006.01)
  *H02K 3/50* (2006.01)
  *H02K 11/33* (2016.01)

(52) U.S. Cl.
  CPC ............ *H02K 3/50* (2013.01); *H02K 2211/03* (2013.01); *H02K 2213/06* (2013.01)

(58) Field of Classification Search
  CPC ........ H02K 16/04; H02K 5/225; B60R 16/03; B62D 5/046; B62D 5/0403; B62D 5/0406
  USPC .......................................................... 310/71
  See application file for complete search history.

(56) References Cited

U.S. PATENT DOCUMENTS

| | | | |
|---|---|---|---|
| 2013/0088128 A1 | 4/2013 | Nakano et al. | |
| 2014/0326530 A1* | 11/2014 | Asao ................... | B62D 5/0406 180/443 |
| 2017/0217481 A1 | 8/2017 | Asao et al. | |
| 2017/0294860 A1 | 10/2017 | Yamasaki | |
| 2019/0140574 A1 | 5/2019 | Yamasaki | |
| 2019/0276071 A1* | 9/2019 | Nagashima ............. | H02P 25/22 |
| 2021/0075301 A1* | 3/2021 | Ichikawa ............... | H02K 11/33 |

FOREIGN PATENT DOCUMENTS

| | | |
|---|---|---|
| EP | 2 634 066 A1 | 9/2013 |
| EP | 3 210 850 A1 | 8/2017 |
| JP | 2002-120739 A | 4/2002 |
| JP | 5147943 B2 | 2/2013 |
| JP | 5518108 B2 | 6/2014 |
| JP | 2017-189034 A | 10/2017 |
| WO | 2013/111365 A1 | 8/2013 |
| WO | 2018/070004 A1 | 4/2018 |

OTHER PUBLICATIONS

Notice of Reasons for Refusal dated Feb. 8, 2022 from the Japanese Patent Office in Japanese Application No. 2020-537985.
International Search Report for PCT/JP2018/031310 dated Oct. 30, 2018 [PCT/ISA/210].
Extended European Search Report issued Jul. 16, 2021 in European Application No. 18930758.0.
Communication dated Sep. 28, 2023, issued in Chinese Application No. 201880096532.6.
Communication dated Dec. 4, 2023, issued in European Application No. 18 930 758.0.
Communication dated Jun. 7, 2024 issued by the State Intellectual Property Office of the P.R.China in application No. 201880096532.6.
Chinese Office Action dated Sep. 30, 2024 in Application No. 201880096532.6.

* cited by examiner

ELECTRIC POWER STEERING APPARATUS

CROSS REFERENCE TO RELATED APPLICATIONS

This application is a National Stage of International Application No. PCT/JP2018/031310 filed Aug. 24, 2018.

TECHNICAL FIELD

The present disclosure relates to an electric power steering apparatus.

BACKGROUND ART

An electric power steering apparatus in which a motor and a control unit for controlling the motor are integrated with each other is well known. As an electric power steering apparatus of this kind, there exists an electric power steering apparatus in which there are provided a motor incorporating motor constituent elements such as a stator and a rotor and a control unit for controlling the motor and in which the motor and the control unit are arranged in parallel with each other in such a way as to be stacked in an extension direction of the output shaft of the motor and are integrated with each other.

To date, in electric power steering apparatuses configured in such a manner as described above, there exist a type in which a control unit is disposed at the anti-output side of the output axel of a motor and a type in which a control unit is disposed at the output side of the output axel of a motor (e.g., refer to Patent Document 1). Moreover, there has been emerging a type having a redundant-system configuration in which a motor has two groups of electric windings and two groups of driving circuit networks corresponding to these windings are provided (e.g., refer to Patent Document 2).

In the conventional electric power steering apparatus disclosed in Patent Document 2, a control unit is disposed at the anti-output side of the output axel of a motor, and in order to realize a redundant-system configuration, two groups of windings are provided and two pieces each of connectors, control boards, microcomputers, switching-device groups, sensors, and the like, which are constituent elements of the control unit, are also provided. In addition, in order to integrate the motor and the control unit, it is taken into consideration that arrangement of the connectors, the control boards, and the like is contrived to reduce the wiring space so that the control unit is downsized.

In contrast, the conventional electric power steering apparatus disclosed in Patent Document 2 does not have a redundant system; however, because a control unit is disposed at the output side of the output shaft of a motor, the output shaft of the motor penetrates the central portion of the control unit. Therefore, the space for containing the constituent elements of the control unit is limited. Thus, the two or more groups of power switch devices included in bridge circuits for driving the motor are radially arranged around the output axel of the motor.

Moreover, to date, there has been proposed an electric power steering apparatus in which the respective configurations of the electric power steering apparatuses disclosed in foregoing Patent Documents 1 and 2 are combined with each other, in which the control unit is disposed at the output side of the output shaft of the motor, and in which a redundant-system configuration is provided.

PRIOR ART REFERENCE

Patent Literature

[Patent Document 1] Japanese Patent No. 5147943
[Patent Document 2] Japanese Patent Application Laid-Open No. 2017-189034

DISCLOSURE OF THE INVENTION

Problems to be Solved by the Invention

In the case of the foregoing electric power steering apparatus in which the control unit is disposed at the output side of the output shaft of the motor and in which a redundant-system configuration is provided, the arrangement is made in such a way that the output shaft of the motor penetrates the central portion of the control unit; therefore, there has been a problem that it is difficult to arrange all the constituent elements of the control unit within the maximum outer diameter of the motor.

The present disclosure has been implemented in order to solve the foregoing problem; the objective thereof is to provide an electric power steering apparatus that makes it possible to realize downsizing.

Means for Solving the Problems

An electric power steering apparatus disclosed in the present application includes a motor having a rotor fixed on an output shaft thereof and a stator and a control unit for controlling the motor; the motor and the control unit are arranged in parallel with each other in a direction in which the output shaft of the motor extends so as to be integrally fixed to each other. The electric power steering apparatus is characterized in that the motor has a first armature winding and a second armature winding,
in that the control unit has a first control unit for controlling the first armature winding and a second control unit for controlling the second armature winding,
in that at least part of constituent elements of the first control unit and at least part of constituent elements of the second control unit are arranged in a peripheral portion of the output shaft, and
in that the constituent elements of the first control unit and the constituent elements, of the second control unit, that correspond to the constituent elements of the first control unit are arranged in point symmetry with respect to a center axis of the output shaft or in line symmetry with respect to a virtual straight line perpendicular to the direction in which the output shaft extends.

Advantage of the Invention

In the electric power steering apparatus disclosed in the present application, at least part of constituent elements of the first control unit and at least part of constituent elements of the second control unit are arranged in a peripheral portion of the output shaft, and the constituent elements of the first control unit and the constituent elements, of the second control unit, that correspond to the constituent elements of the first control unit are arranged in point symmetry with respect to a center axis of the output shaft or in line symmetry with respect to a virtual straight line perpendicular to the direction in which the output shaft extends;

therefore, there is demonstrated an effect that downsizing of the electric power steering apparatus can be realized.

BEST MODE FOR CARRYING OUT THE INVENTION

Embodiment 1

Figure 1:
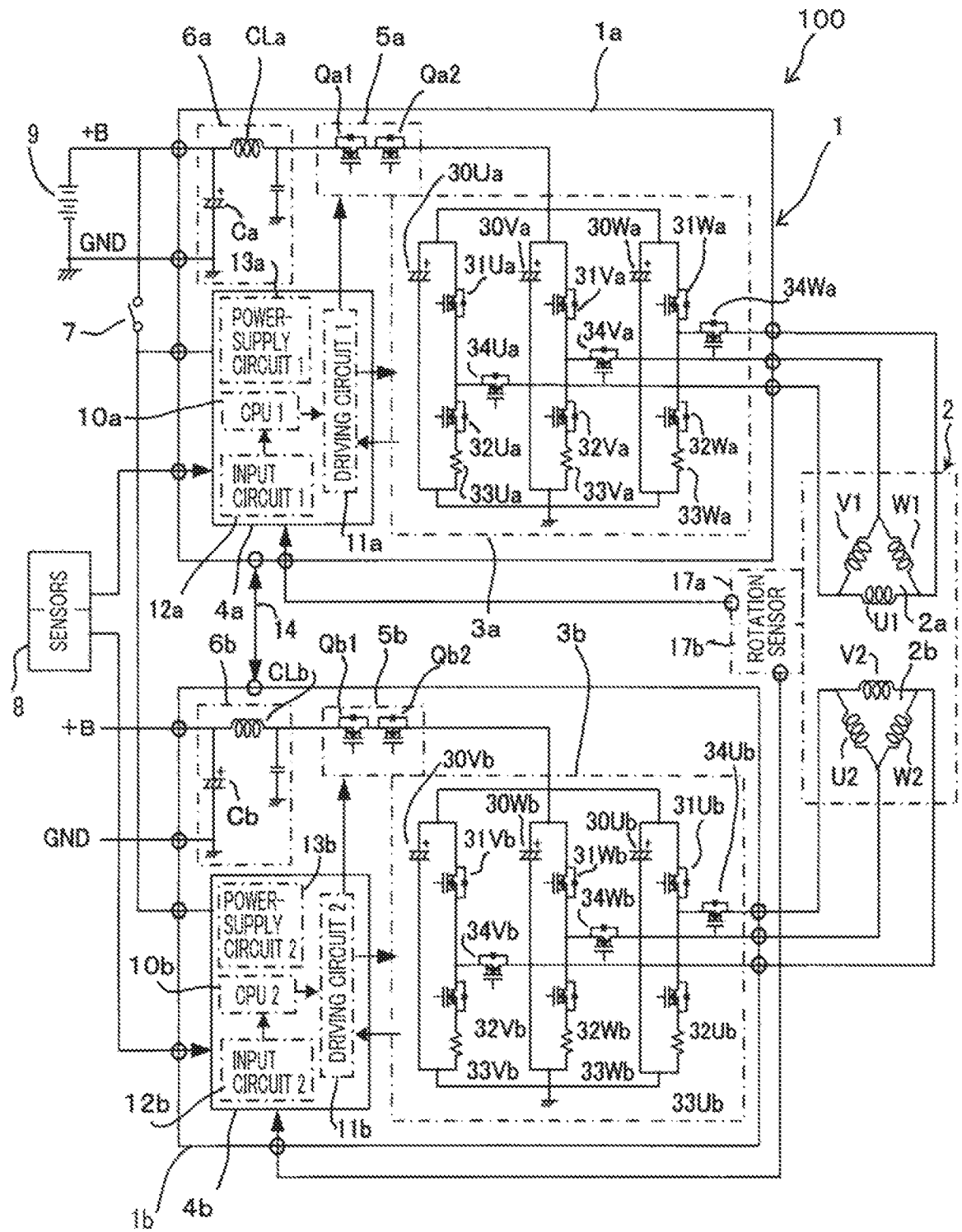
FIG. 1 is an overall circuit diagram of an electric power steering apparatus according to Embodiment 1.

Hereinafter, an electric power steering apparatus according to Embodiment 1 of the present invention will be explained with reference to the drawings. At first, the circuit configuration of an electric power steering apparatus according to Embodiment 1 will be explained. FIG. 1 is an overall circuit diagram of an electric power steering apparatus according to Embodiment 1. In FIG. 1, an electric power steering apparatus 100 is provided with a motor 2 that generates auxiliary torque corresponding to steering torque exerted by a driver on the steering wheel (unillustrated) of a vehicle and with a control unit 1 for controlling the motor 2.

The motor 2 is configured as a three-phase synchronous motor provided with a first armature winding 2a and a second armature winding 2b. The first armature winding 2a and the second armature winding 2b are configured in substantially the same manner; however, they are arranged in such a way as to be shifted from each other by an electric angle of 120°. Hereinafter, a control system for controlling a motor current that flows in the first armature winding 2a may be referred to as a "first group", and a control system for controlling a motor current that flows in the second armature winding 2b may be referred to as a "second group".

The control unit 1 is provided with a first control unit 1a and a second control unit 1b. The first control unit 1a and the second control unit 1b are each configured with the same constituent elements; they are configured in substantially the same manner. The first control unit 1a can independently supply electric power to the first armature winding 2a; the second control unit 1b can independently supply electric power to the second armature winding 2b. The marks "○" in FIG. 1 indicates connection terminals of each of the first control unit 1a and the second control unit 1b.

Next, at first, the first control unit 1a out of the two control units will be explained. The first control unit 1a includes a first control circuit unit 4a provided with a first CPU 10a, a first inverter circuit 3a for supplying a motor current to the first armature winding 2a of the motor 2, a first power-supply relay 5a, and a first filter 6a. One of a pair of power source connection terminals of the first control unit 1a is connected with a +B power-source terminal to be connected with the positive-polarity terminal of a battery 9 mounted in a vehicle; the other one of the pair of power source connection terminals is connected with a ground terminal GND, which is the negative-polarity terminal of the battery 9. The first control unit 1a is configured in such a way that through the intermediary of an ignition switch 7, a +B power source is applied to the first control circuit unit 4a; moreover, the first control unit 1a is configured in such a way as to receive information items inputted from sensors 8 such as a torque sensor, which is mounted in the vicinity of the handwheel of the vehicle and detects steering torque, and a speed sensor, which detects the traveling speed of the vehicle.

The first control circuit unit 4a includes a first power-supply circuit 13a, a first input circuit 12a, the foregoing first CPU 10a, and a first driving circuit 11a. The first power-supply circuit 13a is supplied with a power source by the battery 9 by way of the ignition switch 7 and then generates a power source to be supplied to the constituent elements of the first control circuit unit 4a.

Information items from the sensors 8 are transferred to the first CPU 10a by way of the first input circuit 12a provided in the first control circuit unit 4a. Based on the transferred information items, the first CPU 10a calculates a current value, which is a control amount for rotating the motor 2, and then outputs an output signal corresponding to the calculated current value. The output signal from the first CPU 10a is transferred to the first driving circuit 11a and the first inverter circuit 3a included in a first output circuit. The first driving circuit 11a receives a first command signal, which is an output signal from the first CPU 10a, and then outputs a first drive signal for driving after-mentioned switching devices in the first inverter circuit 3a. In Embodiment 1, the first driving circuit 11a is provided in the first control circuit unit 4a; however, because the current that flows in the first driving circuit 11a is small, the first driving circuit 11a can also be disposed in the first inverter circuit 3a.

The first inverter circuit 3a is formed of a three-phase bridge circuit and includes a U-phase arm including a U-phase upper-arm switching device 31Ua and a U-phase lower-arm switching device 32Ua that are connected in series with each other, a V-phase arm including a V-phase upper-arm switching device 31Va and a V-phase lower-arm switching device 32Va that are connected in series with each other, and a W-phase arm including a W-phase upper-arm switching device 31Wa and a W-phase lower-arm switching device 32Wa that are connected in series with each other.

The series connection portion between the U-phase upper-arm switching device 31Ua and the U-phase lower-arm switching device 32Ua is connected with the connection portion between a U-phase winding U1 and a V-phase winding V1 of the first armature winding 2a, by way of a U-phase motor-relay switching device 34Ua. The series connection portion between the V-phase upper-arm switching device 31Va and the V-phase lower-arm switching device 32Va is connected with the connection portion between a V-phase winding V1 and a W-phase winding W1 of the first armature winding 2a, by way of a V-phase motor-relay switching device 34Va. The series connection portion between the W-phase upper-arm switching device 31Wa and the W-phase lower-arm switching device 32Wa is connected with the connection portion between the W-phase winding W1 and the U-phase winding U1 of the first armature winding 2a, by way of a W-phase motor-relay switching device 34Wa.

A U-phase shunt resistor 33Ua for detecting a U-phase current is connected in series with the U-phase lower-arm switching device 32Ua; a V-phase shunt resistor 33Va for detecting a V-phase current is connected in series with the V-phase lower-arm switching device 32Va; a W-phase shunt resistor 33Wa for detecting a W-phase current is connected in series with the W-phase lower-arm switching device 32Wa.

A U-phase noise suppression capacitor 30Ua is connected in parallel with the U-phase arm including the U-phase upper-arm switching device 31Ua and the U-phase lower-arm switching device 32Ua. A V-phase noise suppression capacitor 30Va is connected in parallel with the V-phase arm including the V-phase upper-arm switching device 31Va and the V-phase lower-arm switching device 32Va. A W-phase noise suppression capacitor 30Wa is connected in parallel with the W-phase arm including the W-phase upper-arm switching device 31Wa and the W-phase lower-arm switching device 32Wa.

The respective electric potential differences across the U-phase shunt resistor 33Ua, the V-phase shunt resistor 33Va, and the W-phase shunt resistor 33Wa and the voltages at the respective winding terminals of the first armature winding 2a are transferred to the first control circuit unit 4a and are inputted to the first CPU 10a. The first CPU 10a calculates a difference between a current command value, calculated by the first CPU 10a based on steering torque exerted by a driver and the like, and a current detection value calculated based on each of the respective electric potential differences across the shunt resistors 33Ua, 33Va, and 33Wa; then, the first CPU 10 provides a first driving command for making the difference zero to the first driving circuit 11a.

Based on the first driving command from the first CPU 10a, the first driving circuit 11a provides drive signals to the respective gate electrodes of the U-phase upper-arm switching device 31Ua, the U-phase lower-arm switching device 32Ua, the V-phase upper-arm switching device 31Va, the V-phase lower-arm switching device 32Va, the W-phase upper-arm switching device 31Wa, and the W-phase lower-arm switching device 32Wa in the first inverter circuit 3a so as to perform PWM (Pulse Width Modulation)-control of these switching devices.

By performing, as described above, feedback control in such a way as to make the difference between the current command value and the current detection value zero, the first control unit 1a supplies a desirable motor current to the first armature winding 2a so that the motor 2 generates assist torque for assisting steering torque exerted by a driver.

Moreover, the first control unit 1a is provided with the first power-supply relay 5a that performs on/off-control of power-source supply from the +B power source of the battery 9 to the first inverter circuit 3a. The first power-supply relay 5a includes a power-supply-relay switching device Qa1 and a power-supply-relay switching device Qa2 that are connected in series with each other. Each of the power-supply-relay switching device Qa1 and the power-supply-relay switching device Qa2 is provided with a parasitic diode connected in parallel therewith; the parasitic diode connected in parallel with the power-supply-relay switching device Qa1 and the parasitic diode connected in parallel with the power-supply-relay switching device Qa2 are connected with each other in such a way that the respective polarities thereof are reverse to each other.

A drive signal from the first control circuit unit 4a performs on/off-control of the power-supply-relay switching devices Qa1 and Qa2, so that the first power-supply relay 5a can perform on/off-control of a current to be supplied to the first armature winding 2a of the motor 2. Because a large current flows in the power-supply-relay switching devices Qa1 and Qa2 of the first power-supply relay 5a, heat generation occurs therein; thus, for example, the power-supply-relay switching devices Qa1 and Qa2 can be formed as a power module included in the first inverter circuit 3a.

Respective driving signal from the first control circuit unit 4a perform on/off-control of the U-phase motor-relay switching device 34Ua, the V-phase motor-relay switching device 34Va, and the W-phase motor-relay switching device 34Wa that are provided in the first inverter circuit 3a, so that respective currents to be supplied from the first inverter circuit 3a to the U-phase winding U1, the V-phase winding V1, and the W-phase winding W1 of the first armature winding 2a can separately be on/off-controlled.

The first CPU 10a has an abnormality detection function of detecting abnormalities in the first driving circuit 11a, the first inverter circuit 3a, the first armature winding 2a, and the like in addition to various kinds of information items, such as a steering torque detection value and a vehicle speed, inputted from the sensors 8; when detecting any of these abnormalities, the first CPU 10a can turn off the upper-arm switching device, the lower-arm switching device, and the motor-relay switching device of the phase where the abnormality has been detected, so that the current supply only for the predetermined phase corresponding to the abnormality is cut off. Alternatively, when the foregoing abnormality is detected, the first CPU 10a can also turn off the first power-supply relay 5a so as to cut off the power source itself to be supplied to the first control unit 1a.

As described above, a driving signal to be provided by the first driving circuit 11a based on the first driving command from the first CPU 10a performs PWM-driving of the first inverter circuit 3a; however, due to the on/off-control of the switching devices of the first inverter circuit 3a through the PWM-driving, switching noise occurs. Accordingly, in order to suppress the switching noise from being radiated, the first filter 6a including a filter capacitor Ca and a filter coil CLa is disposed at the input side of the first inverter circuit 3a, by way of the first power-supply relay 5a.

Next, the second control unit 1b will be explained. The second control unit 1b has a second control circuit unit 4b provided with a second CPU 10b, a second inverter circuit 3b for supplying a motor current to the second armature winding 2b of the motor 2, a second power-supply relay 5b, and a second filter 6b. One of a pair of power source connection terminals of the second control unit 1b is connected with the +B power-source terminal to be connected with the positive-polarity terminal of the battery 9 mounted in the vehicle; the other one of the pair of power source connection terminals is connected with the ground terminal GND, which is the negative-polarity terminal of the battery 9. The second control unit 1b is configured in such a way that through the intermediary of an ignition switch 7, the +B power source is applied to the second control circuit unit 4b; moreover, the second control unit 1b is configured in such away as to receive information items inputted from sensors 8 such as the torque sensor, which is mounted in the vicinity of the handwheel of the vehicle and detects steering torque, and the speed sensor, which detects the traveling speed of the vehicle.

The second control circuit unit 4b includes a second power-supply circuit 13b, a second input circuit 12b, the second CPU 10*b*, and a second driving circuit 1*b*. The second power-supply circuit 13*b* is supplied with a power source by the battery 9 and then generates a power source to be supplied to the constituent elements of the second control circuit unit 4*b*.

Information items from the sensors 8 are transferred to the second CPU 10*b* by way of the second input circuit 12*b* provided in the second control circuit unit 4*b*. Based on the transferred information items, the second CPU 10*b* calculates a current value, which is a control amount for rotating the motor 2, and then outputs an output signal corresponding to the calculation value. The output signal from the second CPU 10*b* is transferred to the second driving circuit 11*b* and the second inverter circuit 3*b* included in a second output circuit. The second driving circuit 1*b* receives a second command signal, which is an output signal from the second CPU 10*b*, and then outputs a second drive signal for driving after-mentioned switching devices in the second inverter circuit 3*b*. In Embodiment 1, the second driving circuit 1*b* is provided in the second control circuit unit 4*b*; however, because the current that flows in the second driving circuit 1*b* is small, the second driving circuit 1*b* can also be disposed in the second inverter circuit 3*b*.

The second inverter circuit 3*b* is formed of a three-phase bridge circuit and includes a U-phase arm including a U-phase upper-arm switching device 31Ub and a U-phase lower-arm switching device 32Ub that are connected in series with each other, a V-phase arm including a V-phase upper-arm switching device 31Vb and a V-phase lower-arm switching device 32Vb that are connected in series with each other, and a W-phase arm including a W-phase upper-arm switching device 31Wb and a W-phase lower-arm switching device 32Wb that are connected in series with each other.

The series connection portion between the U-phase upper-arm switching device 31Ub and the U-phase lower-arm switching device 32Ub is connected with the connection portion between the U-phase winding U2 and the V-phase winding V2 of the second armature winding 2*b*, by way of a U-phase motor-relay switching device 34Ub. The series connection portion between the V-phase upper-arm switching device 31Vb and the V-phase lower-arm switching device 32Vb is connected with the connection portion between a V-phase winding V2 and a W-phase winding W2 of the second armature winding 2*b*, by way of a V-phase motor-relay switching device 34Vb. The series connection portion between the W-phase upper-arm switching device 31Wb and the W-phase lower-arm switching device 32Wb is connected with the connection portion between the W-phase winding W2 and the U-phase winding U2 of the second armature winding 2*b*, by way of a W-phase motor-relay switching device 34Wb.

A U-phase shunt resistor 33Ub for detecting a U-phase current is connected in series with the U-phase lower-arm switching device 32Ub; a V-phase shunt resistor 33Vb for detecting a V-phase current is connected in series with the V-phase lower-arm switching device 32Vb; a W-phase shunt resistor 33Wb for detecting a W-phase current is connected in series with the W-phase lower-arm switching device 32Wb.

A U-phase noise suppression capacitor 30Ub is connected in parallel with the U-phase arm including the U-phase upper-arm switching device 31Ub and the U-phase lower-arm switching device 32Ub. A V-phase noise suppression capacitor 30Vb is connected in parallel with the V-phase arm including the V-phase upper-arm switching device 31Vb and the V-phase lower-arm switching device 32Vb. A W-phase noise suppression capacitor 30Wb is connected in parallel with the W-phase arm including the W-phase upper-arm switching device 31Wb and the W-phase lower-arm switching device 32Wb.

The respective electric potential differences across the U-phase shunt resistor 33Ub, the V-phase shunt resistor 33Vb, and the W-phase shunt resistor 33Wb and the voltages at the respective winding terminals of the second armature winding 2*b* are transferred to the second control circuit unit 4*b* and are inputted to the second CPU 10*b*. The respective electric potential differences across the U-phase shunt resistor 33Ub, the V-phase shunt resistor 33Vb, and the W-phase shunt resistor 33Wb and the voltages at the respective winding terminals of the second armature winding 2*b* are transferred to the second control circuit unit 4*b* and are inputted to the second CPU 10*b*.

Based on the second driving command from the second CPU 10*b*, the second driving circuit 1*b* provides drive signals to the respective gate electrodes of the U-phase upper-arm switching device 31Ub, the U-phase lower-arm switching device 32Ub, the V-phase upper-arm switching device 31Vb, the V-phase lower-arm switching device 32Vb, the W-phase upper-arm switching device 31Wb, and the W-phase lower-arm switching device 32Wb in the second inverter circuit 3*b* so as to perform PWM (Pulse Width Modulation)-control of these switching devices.

By performing, as described above, feedback control in such a way as to make the difference between the current command value and the current detection value zero, the second control unit 1*b* supplies a desirable motor current to the second armature winding 2*b* so that the motor 2 generates assist torque for assisting steering torque exerted by a driver.

Moreover, the second control unit 1*b* is provided with the second power-supply relay 5*b* that performs on/off-control of power-source supply from the +B power source of the battery 9 to the second inverter circuit 3*b*. The second power-supply relay 5*b* includes a power-supply-relay switching device Qb1 and a power-supply-relay switching device Qb2 that are connected in series with each other. The second power-supply relay 5*b* includes a power-supply-relay switching device Qb1 and a power-supply-relay switching device Qb2 that are connected in series with each other.

A drive signal from the second control circuit unit 4*b* performs on/off-control of the power-supply-relay switching devices Qb1 and Qb2, so that the second power-supply relay 5*b* can perform on/off-control of a current to be supplied to the second armature winding 2*b* of the motor 2. Because a large current flows in the power-supply-relay switching devices Qb1 and Qb2 of the second power-supply relay 5*b*, heat generation occurs therein; thus, the power-supply-relay switching devices Qb1 and Qb2 can be formed as a power module included in second inverter circuit 3*b*.

Respective driving signals from the second control circuit unit 4*b* perform on/off-control of the U-phase motor-relay switching device 34Ub, the V-phase motor-relay switching device 34Vb, and the W-phase motor-relay switching device 34Wb that are provided in the second inverter circuit 3*b*, so that respective currents to be supplied from the second inverter circuit 3*b* to the U-phase winding U2, the V-phase winding V2, and the W-phase winding W2 of the second armature winding 2*b* can separately be on/off-controlled.

The second CPU 10*b* has an abnormality detection function of detecting abnormalities in the second driving circuit 1*b*, the second inverter circuit 3*b*, the second armature winding 2*b*, and the like in addition to various kinds of information items, such as a steering torque detection value and a vehicle speed, inputted from the sensors 8; when detecting any of these abnormalities, the second CPU 10*b* can turn off the upper-arm switching device, the lower-arm switching device, and the motor-relay switching device of the phase where the abnormality has been detected, so that the current supply only for the predetermined phase corresponding to the abnormality is cut off. Alternatively, when the foregoing abnormality is detected, the second CPU 10*b* can also turn off the second power-supply relay 5*b* so as to cut off the power source itself to be supplied to the second control unit 1*b*.

As described above, a driving signal to be provided by the second driving circuit 11*b* based on the second driving command from the second CPU 10*b* performs PWM-driving of the second inverter circuit 3*b*; however, due to the on/off-control of the switching devices of the second inverter circuit 3*b* through the PWM-driving, switching noise occurs. Accordingly, in order to suppress the switching noise from being radiated, the second filter 6*b* including a filter capacitor Cb and a filter coil CLb is disposed at the input side of the second inverter circuit 3*b*, by way of the second power-supply relay 5*b*.

The motor 2 is a brushless motor in which as described above, each of the two groups of armature windings, i.e., each of the three-phase first armature winding 2*a* and the three-phase second armature winding 2*b* is delta-connected. A first rotation sensor 17*a* and a second rotation sensor 17*b* are provided so that for the brushless motor, the rotation position of the rotor is detected. As described above, in order to secure the redundancy, two rotation sensors that each have substantially one and the same configuration are provided. Information indicating the rotation position of the rotor, detected by the first rotation sensor 17*a*, is transferred to the first control circuit unit 4*a* and is inputted to the first input circuit 12*a*. Information indicating the rotation position of the rotor, detected by the second rotation sensor 17*b*, is transferred to the second control circuit unit 4*b* and is inputted to the second input circuit 12*b*.

It may be allowed that the motor 2 is not three-phase delta-connected brushless motor but either a three-phase star-connected brushless motor or a motor having dipole-two-pair brushes. Moreover, as is the case with a conventional apparatus, the winding specification of the armature winding may either distributed winding or concentrated winding. Furthermore, the motor 2 may be a so-called tandem motor having two stators. In this case, there may be only one group of armature windings, or two groups of armature windings are provided and these armature windings collaborate with each other so as to perform driving; what matters is that the configuration can output a desirable motor rotation speed and torque.

As described above, the electric power steering apparatus 100 according to Embodiment 1 has two independent groups each of circuit networks, connectors, sensors, and the like and secures the redundancy; each of the first control unit 1*a* and the second control unit 1*b* is configured in such a way as to be able to independently drive the motor 2 by independently utilizing input information and a control-amount calculation value.

The first control unit 1*a* and the second control unit 1*b* are connected with each other through a communication line 14 so as to be able to mutually receive and transmit data and information thereof. The communication line 14 mutually connects the first CPU 10*a* with the second CPU 10*b*, so that one of these CPUs can comprehend the other one's situation. For example, when the first CPU 10*a* detects the foregoing abnormality and hence turns off the foregoing switching device, the contents of the abnormality detection, the abnormal component, the motor-driving state, and the like can be transferred to the second CPU 10*b*. Provided an abnormality occurs in any one of the CPUs itself, a periodical communication signal based on a predetermined format cannot be received and transmitted, so that one of the CPUs can detect that an abnormality has occurred in the other one of the CPUs itself.

Figure 2:
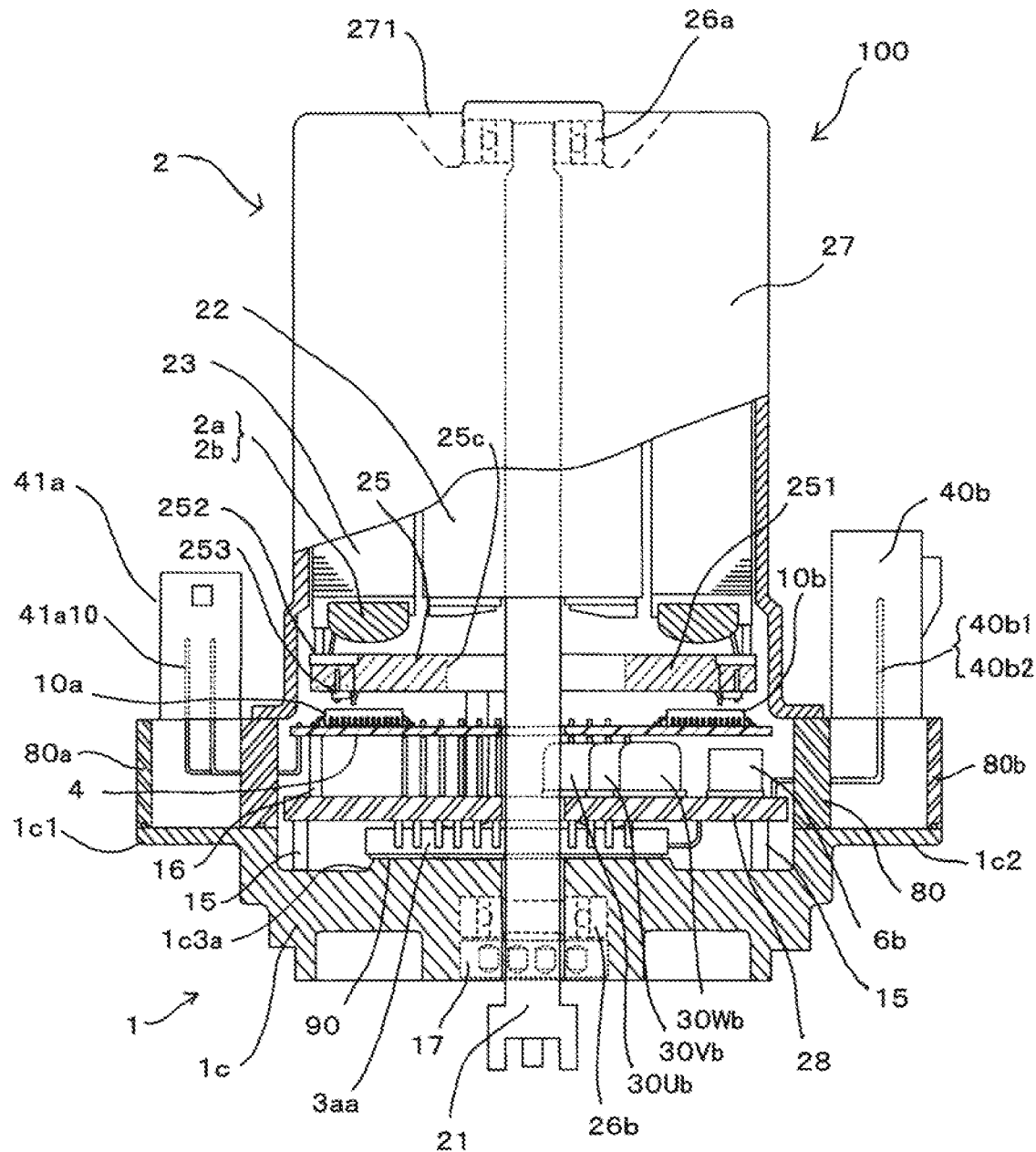
FIG. 2 is a partial cross-sectional view illustrating the overall electric power steering apparatus according to Embodiment 1.
Figure 3:
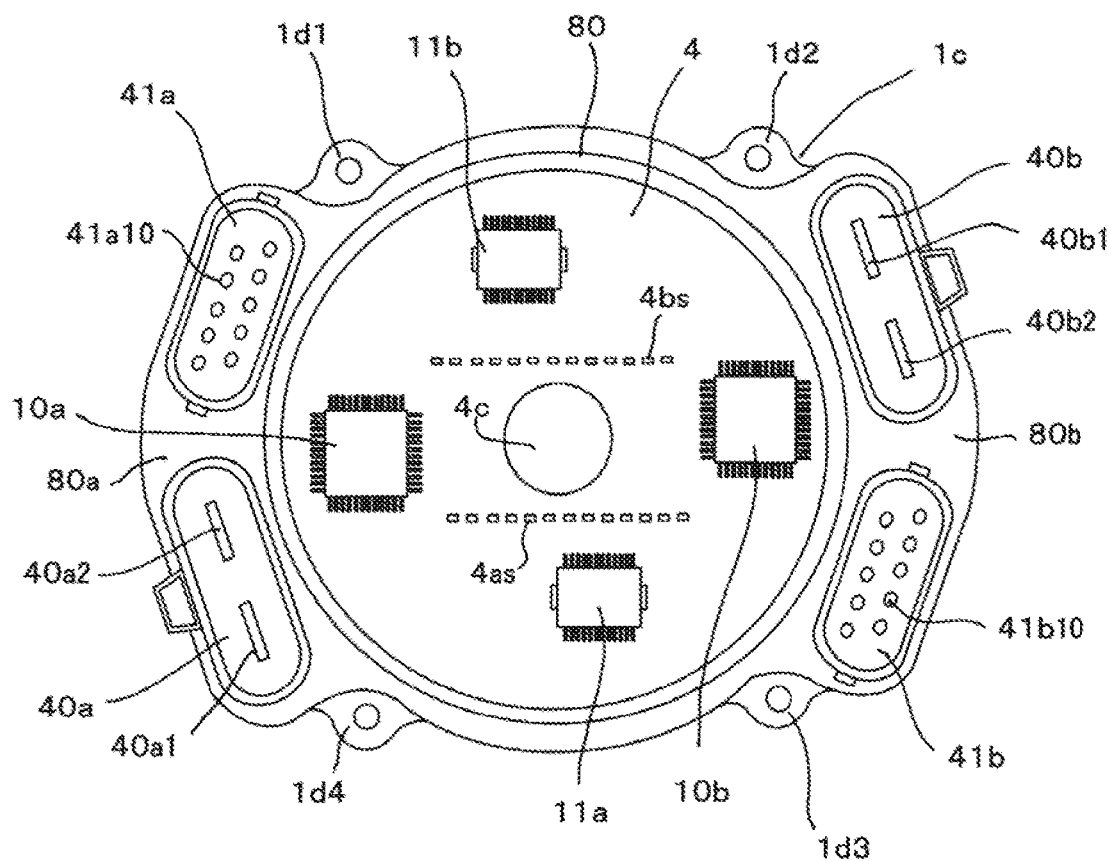
FIG. 3 is a plan view illustrating a control board and the periphery thereof in the electric power steering apparatus according to Embodiment 1.
Figure 4:
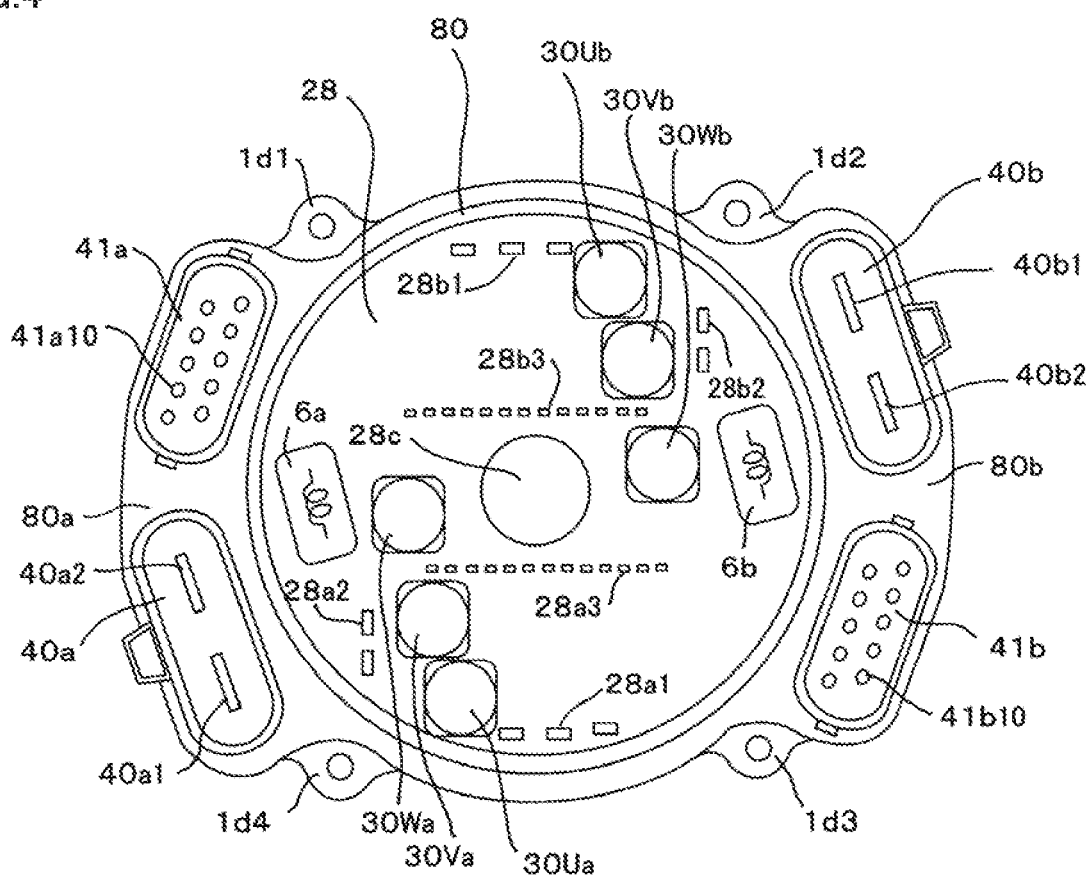
FIG. 4 is a plan view illustrating a relay member and the periphery thereof in the electric power steering apparatus according to Embodiment 1.
Figure 5:
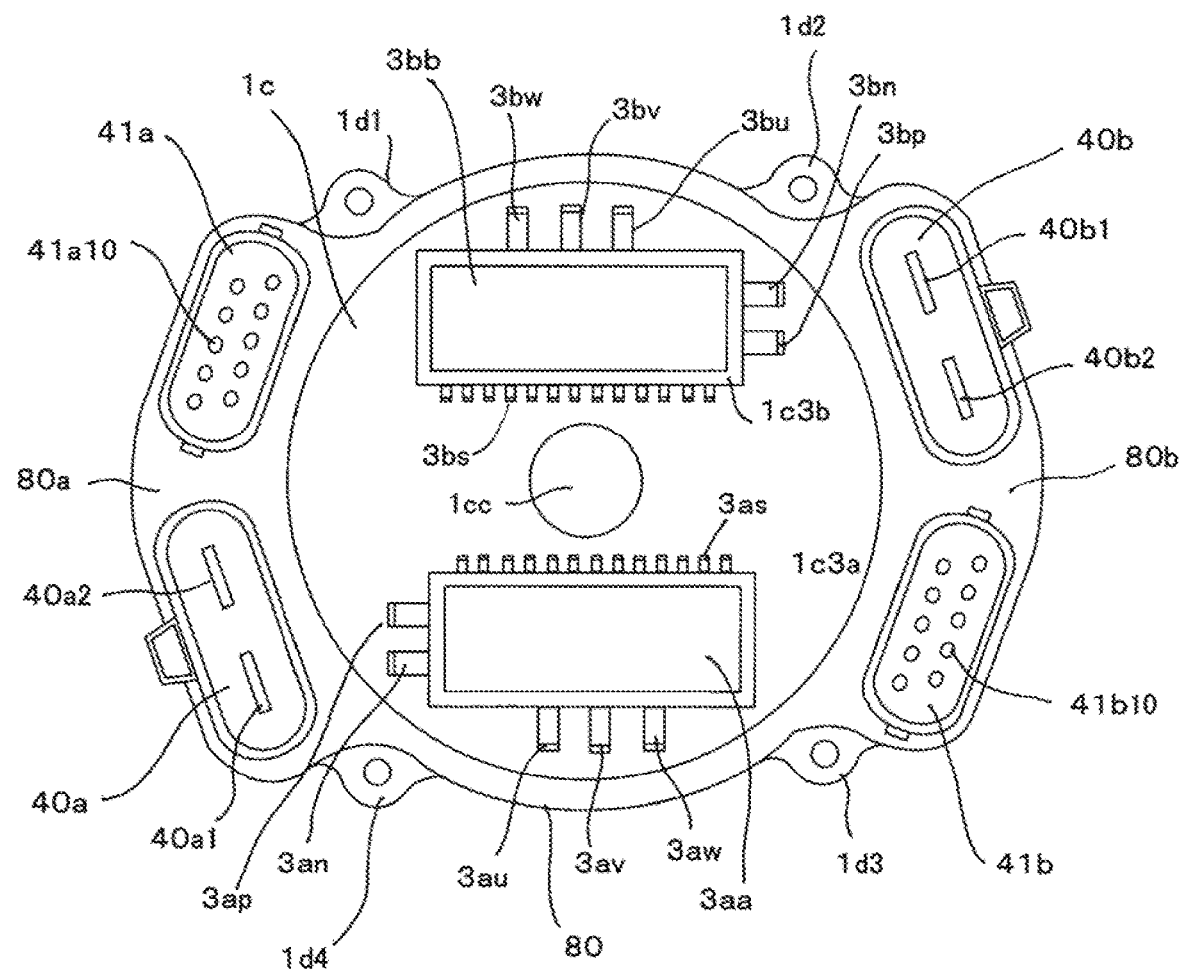
FIG. 5 is a plan view illustrating a wall surface portion of a housing and the periphery thereof in the electric power steering apparatus according to Embodiment 1.

Next, the structure of the electric power steering apparatus according to Embodiment 1 will be explained. FIG. 2 is a partial cross-sectional view illustrating the overall electric power steering apparatus according to Embodiment 1; FIG. 3 is a plan view illustrating a control board and the periphery thereof in the electric power steering apparatus according to Embodiment 1; FIG. 4 is a plan view illustrating a relay member and the periphery thereof in the electric power steering apparatus according to Embodiment 1; FIG. 5 is a plan view illustrating a wall surface portion of a housing and the periphery thereof in the electric power steering apparatus according to Embodiment 1.

In FIGS. 2, 3, 4, and 5, in the electric power steering apparatus 100, the motor 2 and the control unit 1 are integrally fixed to each other in such a way as to be stacked on each other in the extension direction of the output shaft 21 of the motor 2. The motor 2 mainly includes an output shaft 21 incorporated in a case 27, a rotor 22 fixed on the output shaft 21, and a stator 23 having an inner circumferential surface that faces the outer circumference portion of the rotor 22 via a gap. Two or more pairs of magnetic-field magnets that are each formed of a permanent magnet are arranged in the outer circumference portion of the rotor 22. The stator 23 has two groups of armature windings including the three-phase first armature winding 2*a* and the three-phase second armature winding 2*b*. The anti-output-side end portion of the output shaft 21 is pivotably supported by a first bearing 26*a* fixed to an end wall portion 271 that seals an axial-direction one end portion of the case 27; the output-side end portion of the output shaft 21 is pivotably supported by a second bearing 26*b* fixed to an after-mentioned housing 1*c* of the control unit 1.

A terminal portion 25 formed in the shape of a ring is fixed to the axis-direction end portion of the stator 23 in such a way that the plane thereof is disposed to be perpendicular to the extension direction of the output shaft 21 of the motor 2. The ring-shaped terminal portion 25 has a resin insulating plate 251 formed in the shape of a ring, two or more connecting conductors 252 fixed to the insulating plate 251 in such a way as to be exposed to the motor-side surface of the insulating plate 251, and two or more connecting conductors 253 fixed to the insulating plate 251 in such a way as to be exposed to the anti-motor-side surface of the insulating plate 251. The output shaft 21 penetrates a penetration hole 25*c* provided in the center of the terminal portion 25. As illustrated in FIG. 2, for example, the connecting conductor 252 is fitted to a U-shaped portion formed in the peripheral portion of the insulating plate 251 in such a way that the surface thereof and the surface of the insulating plate 251 are on one and the same plane.

The two or more connecting conductors 252 provided in the terminal portion 25 performs mutual connection among the U-phase winding U1, the V-phase winding V1, and the W-phase winding W1 of the first armature winding 2*a* in such a way that the connection of the first armature winding 2*a* becomes, for example, a three-phase delta connection; concurrently, the two or more connecting conductors 252 performs mutual connection among the U-phase winding U2, the V-phase winding V2, and the W-phase winding W2 of the second armature winding 2b in such a way that the connection of the second armature winding 2b becomes, for example, a three-phase delta connection.

The two or more connecting conductors 253 provided in the terminal portion 25 form three first winding terminals connected with the respective winding end portions (unillustrated) of the first armature winding 2a of the motor 2 and three second winding terminals connected with the respective winding end portions (unillustrated) of the second armature winding 2b of the motor 2. The three first winding terminals formed of the connecting conductors 253 are collectively pulled out from the terminal portion 25 to the vicinity of the inner circumference portion of the control unit 1. The three second winding terminals formed of the connecting conductors 253 are collectively pulled out from the terminal portion 25 to the vicinity of the inner circumference portion of the control unit 1. The group of the first winding terminals and the group of the second winding terminals pulled out from the terminal portion 25 are collectively arranged at the symmetric positions, for example, in the vicinity of the inner circumference portion of the control unit 1.

The control unit 1 has a ring-shaped resin insulating case 80 whose axial-direction one end portion is fixed to the axial-direction open end portion of the case 27 of the motor 2 and a metal housing 1c whose axial-direction one end portion is fixed to the axial-direction the other end portion of the insulating case 80; the inner space of the control unit 1 is formed inside the insulating case 80 and the housing 1c. A control board 4 and a relay member 28 are contained in the inner space of the control unit 1, formed of the insulating case 80 and the housing 1c. Four mounting holes 1d1, 1d2, 1d3, and 1d4 are formed in the outer circumference portion of the housing 1c. The housing 1c and the case 27 of the motor 2 are integrally fixed to each other through fixing devices (unillustrated) such as respective bolts that penetrate the housing mounting holes 1d1, 1d2, 1d3, and 1d4 and respective corresponding mounting portions (unillustrated) provided in the case 27 of the motor 2. Because being pinched by the case 27 and the housing 1c, the insulating case 80 is integrally fixed to the case 27 and the housing 1c.

The control board 4 formed in the shape of a disk is disposed in such a way that the plane thereof is perpendicular to the extension direction of the output shaft 21 of the motor 2. The output shaft 21 penetrates a penetration hole 4c provided in the central portion of the control board 4. As well illustrated in FIG. 3, on the control board 4, for example, the first CPU 10a in the first control circuit unit 4a and the second CPU 10b in the second control circuit unit 4b are arranged substantially in point symmetry with respect to the center axis of the output shaft 21 that penetrates the penetration hole 4c; the first driving circuit 11a in the first control circuit unit 4a and the second driving circuit 11b in the second control circuit unit 4b are arranged substantially in point symmetry with respect to the center axis of the output shaft 21 that penetrates the penetration hole 4c.

The relay member 28 formed in the shape of a disk is disposed in such a way that the plane thereof is perpendicular to the extension direction of the output shaft 21 of the motor 2, and is fixed to the motor-side inner wall surface of the housing 1c through the intermediary of two or more supporting members 15. The relay member 28 fixes the control board 4 through the intermediary of two or more supporting members 16. The output shaft 21 penetrates a penetration hole 28c provided in the central portion of the relay member 28.

The relay member 28 is formed of an insulating resin; a bus bar formed of a conductive plate is wired (unillustrated) on the surface or in the inside thereof. On the relay member 28, the first filter 6a, the U-phase noise suppression capacitor 30Ua, the V-phase noise suppression capacitor 30Va, and the W-phase noise suppression capacitor 30Wa, which are relatively large components, are arranged close to a first power-supply connector 40a. In addition, on the relay member 28, the second filter 6b, the U-phase noise suppression capacitor 30Ub, the V-phase noise suppression capacitor 30Vb, and the W-phase noise suppression capacitor 30Wb, which are relatively large components, are arranged close to a second power-supply connector 40b.

As well illustrated in FIG. 4, on the control board 4, for example, the first filter 6a and the second filter 6b are arranged substantially in point symmetry with respect to the center of the penetration hole 28c, i.e., the center axis of the output shaft 21 that penetrates the penetration hole 28c; furthermore, the U-phase noise suppression capacitor 30Ua, the V-phase noise suppression capacitor 30Va, and the W-phase noise suppression capacitor 30Wa in the first inverter circuit 3a and the U-phase noise suppression capacitor 30Ub, the V-phase noise suppression capacitor 30Vb, and the W-phase noise suppression capacitor 30Wb, respectively, in the second inverter circuit 3b are arranged substantially in point symmetry with respect to the center axis of the output shaft 21.

The housing 1c has a first housing extension portion 1c1 and a second housing extension portion 1c2 that each extend in the radial direction at respective opposite positions in the outer circumference portion thereof, for example. The first housing extension portion 1c1 and the second housing extension portion 1c2 are arranged substantially in point symmetry with respect to the center axis of the output shaft 21.

As well illustrated in FIGS. 3 and 4, the insulating case 80 has a first insulating case extension portion 80a and a second insulating case extension portion 80b that each extend in the radial direction at respective opposite positions in the outer circumference portion thereof, for example. The first insulating case extension portion 80a and the second insulating case extension portion 80b are arranged substantially in point symmetry with respect to the center axis of the output shaft 21.

The respective axis-direction end portions of the first housing extension portion 1c1 and the first insulating case extension portion 80a abut on each other; the respective axis-direction end portions of the second housing extension portion 1c2 and the second insulating case extension portion 80b abut on each other. A synchronized resolver 17 forming the first rotation sensor 17a and the second rotation sensor 17b is mounted in the central portion of the housing 1c in such a way as to be adjacent to the second bearing 26b. In addition, each of the first rotation sensor 17a and the second rotation sensor 17b may not be the synchronized resolver 17 but may be formed of, for example, either a magnetic resistance (MR) device or a hole device utilizing a semiconductor.

The first power-supply connector 40a is formed integrally with the first insulating case extension portion 80a; a pair of power-supply terminal conductors 40a1 and 40a2 to be connected with the +B power-source terminal and the ground terminal GND, respectively, of the battery 9 are provided in such a way as to be insert-molded in an insulating resin. The second power-supply connector 40b is formed integrally with the second insulating case extension portion 80b; a pair of power-supply terminal conductors 40b1 and 40b2 to be connected with the +B power-source terminal and the ground terminal GND, respectively, of the battery 9 are provided in such a way as to be insert-molded in an insulating resin. As well illustrated in FIGS. 3 and 4, the first power-supply connector 40a and the second power-supply connector 40b are arranged, for example, substantially in point symmetry with respect to the center of the penetration hole 4c in the control board 4 and the center of the penetration hole 28c in the relay member 28, i.e., the center axis of the output shaft that penetrates the penetration hole 4c and the penetration hole 28c.

A first signal connector 41a is formed integrally with the first insulating case extension portion 80a; two or more signal terminal conductors 41a10 to be connected with respective lead wires from the sensors 8 and the first rotation sensor 17a are provided in such a way as to be insert-molded in an insulating resin. A second signal connector 41b is formed integrally with the second insulating case extension portion 80b; two or more signal terminal conductors 41b10 to be connected with respective lead wires from the sensors 8 and the second rotation sensor 17b are provided in such a way as to be insert-molded in an insulating resin. As well illustrated in FIGS. 3 and 4, the first signal connector 41a and the second signal connector 41b are arranged, for example, substantially in point symmetry with respect to the center axis of the output shaft 21 that penetrates the center of the penetration hole 4c in the control board 4 and the center of the penetration hole 28c in the relay member 28, i.e., the penetration hole 4c and the penetration hole 28c.

The first power-supply connector 40a, the second power-supply connector 40b, the first signal connector 41a, and the second signal connector 41b are each configured to protrude from the axis-direction end surface of the housing 1c toward the motor 2; however, all of or at least part of them may be configured to protrude toward the anti-motor 2 side.

A first power module 3aa formed in the shape of a rectangle includes the first inverter circuit 3a and the first power-supply relay 5a; the first power module 3aa is configured in such a way that the U-phase upper-arm switching device 31Ua, the U-phase lower-arm switching device 32Ua, V-phase upper-arm switching device 31Va, the V-phase lower-arm switching device 32Va, W-phase upper-arm switching device 31Wa, and W-phase lower-arm switching device 32Wa in the first inverter circuit 3a and the power-supply-relay switching devices Qa1 and Qa2 in the first power-supply relay 5a are integrally molded with resin; the first power module 3aa is adhered with a heat-radiating adhesive 90 to the surface of a first protruding portion 1c3a formed in the inner wall surface of the metal housing 1c.

A second power module 3bb formed in the shape of a rectangle includes the second inverter circuit 3b and the second power-supply relay 5b; the second power module 3bb is configured in such a way that the U-phase upper-arm switching device 31Ub, the U-phase lower-arm switching device 32Ub, V-phase upper-arm switching device 31Vb, the V-phase lower-arm switching device 32Vb, W-phase upper-arm switching device 31Wb, and W-phase lower-arm switching device 32Wb in the second inverter circuit 3b and the power-supply-relay switching devices Qb1 and Qb2 in the second power-supply relay 5b are integrally molded with resin; the second power module 3bb is adhered with a heat-radiating adhesive (unillustrated) to the surface of a second protruding portion 1c3b formed in the inner wall surface of the metal housing 1c.

As illustrated in FIG. 5, the first power module 3aa and the second power module 3bb are arranged in point symmetry with respect to the center of a penetration hole 1cc provided in the central portion of the housing 1c, i.e., the center axis of the output shaft 21 that penetrates the penetration hole 1cc.

The housing 1c having a function as a heat sink is formed of aluminum so as to raise the heat radiation performance; the housing 1c radiates heat generated by the first power module 3aa and the second power module 3bb to the outside of the control unit 1 so as to cool the first power module 3aa and the second power module 3bb. In addition, the first protruding portion 1c3a and the second protruding portion 1c3b may be formed either integrally with each other or separately from each other as illustrated in FIG. 5.

As illustrated in FIG. 2, in the inner space, of the control unit 1, that is formed by the housing 1c and the insulating case 80, the control board 4, the relay member 28, and the first power module 3aa and the second power module 3bb are arranged in that order from the motor 2 side in such a way as to be stacked on one another.

Three first output terminals 3au, 3av, and 3aw of the first power module 3aa are each pulled out from the side surface of one of the long sides of the first power module 3aa to the outside of the first power module 3aa in a direction parallel to the main surface of the first power module 3aa, each bent substantially at right angle toward the motor 2 at predetermined positions, each penetrate the relay member 28 so as to extend toward the motor 2, and then are each connected with the respective winding terminals of the first armature winding 2a, through the intermediary of the tow or more connecting conductors 253 provided in the terminal portion 25.

Two first power-supply terminals 3ap and 3an of the first power module 3aa are each pulled out from the side surface of one of the short sides of the first power module 3aa to the outside of the first power module 3aa in a direction parallel to the main surface of the first power module 3aa, each bent substantially at right angle toward the motor 2 at predetermined positions so as to extend toward the motor 2, and then are connected with the pair of power-supply terminal conductors 40a1 and 40a2, respectively, of the first power-supply connector 40a that penetrate the relay member 28 and the insulating case 80.

Two or more first signal terminals 3as of the first power module 3aa are each pulled out from the side surface of the other one of the long sides of the first power module 3aa to the outside of the first power module 3aa in a direction parallel to the main surface of the first power module 3aa, each bent substantially at right angle toward the motor 2 at predetermined positions, each penetrate the relay member 28 so as to extend toward the motor 2, and then are each connected with the first driving circuit 11a fixed to the control board 4.

Three second output terminals 3bu, 3bv, and 3bw of the second power module 3bb are each pulled out from the side surface of one of the long sides of the second power module 3bb to the outside of the second power module 3bb in a direction parallel to the main surface of the second power module 3bb, each bent substantially at right angle toward the motor 2 at predetermined positions, each penetrate the relay member 28 so as to extend toward the motor 2, and then are each connected with the respective winding terminals of the second armature winding 2b, through the intermediary of the tow or more connecting conductors 253 provided in the terminal portion 25.

Two second power-supply terminals 3bp and 3bn of the second power module 3bb are each pulled out from the side surface of one of the short sides of the second power module 3bb to the outside of the second power module 3bb in a direction parallel to the main surface of the second power module 3bb, each bent substantially at right angle toward the motor 2 at predetermined positions so as to extend toward the motor 2, and then are connected with the pair of power-supply terminal conductors 40b1 and 40b2, respectively, of the second power-supply connector 40b that penetrate the relay member 28 and the insulating case 80.

Two or more second signal terminals 3bs of the second power module 3bb are each pulled out from the side surface of the other one of the long sides of the second power module 3bb to the outside of the second power module 3bb in a direction parallel to the main surface of the second power module 3bb, each bent substantially at right angle toward the motor 2 at predetermined positions, each penetrate the relay member 28 so as to extend toward the motor 2, and then are each connected with the second driving circuit 11b fixed to the control board 4.

As illustrated in FIG. 3, the control board 4 is provided with two or more respective signal-terminal penetration holes 4as that are in a row and are penetrated by the two or more signal terminals 3as pulled out from the first power module 3aa and with two or more respective signal-terminal penetration holes 4bs that are in a row and are penetrated by the two or more signal terminals 3bs pulled out from the second power module 3bb.

As illustrated in FIG. 4, the relay member 28 is provided with three first output-terminal penetration holes 28a1 that are in a row and are penetrated by the three first output terminals 3au, 3av, and 3aw pulled out from the first power module 3aa or by the three winding terminals of the first armature winding 2a, with two respective first power-supply terminal penetration holes 28a2 that are penetrated by the two first power-supply terminals 3ap and 3an pulled out from the first power module 3aa, and with two or more respective first signal-terminal penetration holes 28a3 that are penetrated by the two or more first signal terminals 3as pulled out from the first power module 3aa.

Furthermore, the relay member 28 is provided with three second output-terminal penetration holes 28b1 that are in a row and are penetrated by the three second output terminals 3bu, 3bv, and 3bw pulled out from the second power module 3bb or by the three winding terminals of the second armature winding 2b, with two respective second power-supply terminal penetration holes 28b2 that are penetrated by the two second power-supply terminals 3bp and 3bn pulled out from the second power module 3bb, and with two or more respective second signal-terminal penetration holes 28b3 that are penetrated by the two or more second signal terminals 3bs pulled out from the second power module 3bb.

The first output-terminal penetration hole 28a1 and the second output-terminal penetration hole 28b1 are arranged substantially in point symmetry with respect to the center of the penetration hole 28c, i.e., the center axis of the output shaft 21 that penetrates the penetration hole 28c; the first power-supply terminal penetration hole 28a2 and the second power-supply terminal penetration hole 28b2 are arranged substantially in point symmetry with respect to the center of the penetration hole 28c, i.e., the center axis of the output shaft 21 that penetrates the penetration hole 28c. Moreover, the first signal-terminal penetration hole 28a3 and the second signal-terminal penetration hole 28b3 are arranged substantially in point symmetry with respect to the center of the penetration hole 28c, i.e., the center axis of the output shaft 21 that penetrates the penetration hole 28c.

Because the cross-sectional area of each of the first output terminals 3au, 3av, and 3aw or the winding terminal of the first armature winding 2a, in each of which a relatively large current flows, is formed to be large, the first output-terminal penetration hole 28a1 that is penetrated by the foregoing first output terminal or winding terminal is formed to be large in accordance with the cross-sectional area; furthermore, similarly, because the cross-sectional area of each of the two first power-supply terminals 3ap and 3an, in each of which a relatively large current flows, is formed to be large, each of the two first power-supply terminal penetration holes 28a2 that are penetrated by the respective foregoing first power-supply terminals is formed to be large in accordance with the foregoing cross-sectional area. Because the cross-sectional area of each of the second output terminals 3bu, 3bv, and 3bw or the winding terminal of the second armature winding 2b, in each of which a relatively large current flows, is formed to be large, each of the three second output-terminal penetration holes 28b1 that are penetrated by the respective foregoing second output terminals is formed to be large in accordance with the foregoing cross-sectional area; furthermore, because the cross-sectional area of each of the two second power-supply terminals 3bp and 3bn, in each of which a relatively large current flows, is formed to be large, each of the two second power-supply terminal penetration holes 28b2 that are penetrated by the respective foregoing second power-supply terminals is formed to be large in accordance with the foregoing cross-sectional area.

In contrast, because the cross-sectional area of each of the first signal terminals 3as, in each of which a relatively small current flows, is formed to be small, each of the two or more first signal-terminal penetration holes 28a3 that are penetrated by the respective first signal terminals 3as is formed to be small in accordance with the foregoing cross-sectional area; because the cross-sectional area of each of the second signal terminals 3bs, in each of which a relatively small current flows, is formed to be small, each of the two or more second signal-terminal penetration holes 28b3 that are penetrated by the respective second signal terminals 3bs is formed to be small in accordance with the foregoing cross-sectional area.

In the electric power steering apparatus 100 according to Embodiment 1, configured in such a manner as described above, in order to realize downsizing thereof, the respective maximum outer diameters of the control unit 1 and the motor 2 are formed to be substantially equal to each other. Accordingly, as described above, the principle constituent elements of the control unit 1 are contained in the inner space, of the control unit 1, that is made by the insulating case 80 and the housing 1c. In this regard, however, the after-mentioned first power-supply connector 40a, second power-supply connector 40b, first signal connector 41a, and second signal connector 41b for the connection with the vehicle-side harness are not arranged within the maximum outer diameter of the motor 2.

Moreover, because the first control circuit unit 4a and the second control circuit unit 4b are configured in one and the same manner, the first CPU 10a and the second CPU 10b mounted on the control board 4 are also arranged substantially in point symmetry with respect to the center of the penetration hole 4c, i.e., the center axis of the output shaft 21 that penetrates the penetration hole 4c; furthermore, the first driving circuit 11a and the second driving circuit 11b are also arranged substantially in point symmetry with respect to the center of the penetration hole 4c, i.e., the center axis of the output shaft 21 that penetrates the penetration hole 4c.

As described above, because the first power-supply connector 40a and the second power-supply connector 40b, and the principal constituent elements of the control unit 1 mounted on the control board 4 and the relay member 28 are arranged in point symmetry with respect to the center axis of the output shaft 21, the constituent elements of the electric power steering apparatus 100 can intensively be arranged; moreover, it is made possible to make the flow of a current uniform, and hence unillustrated wiring leads in the control board 4 can also be reduced and downsized.

As described above, the structure of the relay member 28, the components mounted on the relay member 28, and the penetration holes that are penetrated by the respective terminals are arranged substantially in point symmetry with respect to the center of the penetration hole 4c, i.e., the center axis of the output shaft 21 that penetrates the penetration hole 4c; thus, the lengths of the wiring leads can be shortened and hence an arrangement space for relatively large components can be secured.

As described above, the first power module 3aa and the second power module 3bb are arranged substantially in point symmetry with respect to the penetration hole 1cc in the housing 1c, i.e., the center axis of the output shaft 21 that penetrates the penetration hole 1cc; therefore, contribution to downsizing the apparatus can be performed by shortening and centralizing the wiring leads. The respective components, connectors, circuit components, and power modules are configured with each two groups that each have the same function and are arranged in the same manner; thus, the number of the respective kinds is one.

In the foregoing explanation, the first power-supply connector 40a and the first signal connector 41a are arranged to be adjacent to each other, and the second power-supply connector 40b and the second signal connector 41b are arranged to be adjacent to each other; however, the respective foregoing members can be arranged to be separate from each other; it is only necessary to determine the arrangement of these members by considering the direction of the connection with the vehicle-side connector, the structure of the connection with the control board, and the like.

As described above, in the electric power steering apparatus 100 according to Embodiment 1, respective two constituent-element groups, in the first control unit 1a and the second control unit 1b, that correspond to each other are arranged in point symmetry with respect to center axis of the output shaft of the motor; therefore, because the respective constituent elements of the control unit 1 are arranged in such a way as to surround the output shaft, downsizing of the electric power steering apparatus can be realized. Moreover, because respective two groups of the control circuits, two groups of the inverters, and the like are arranged and wired in substantially the same manner, there is demonstrated an effect that the respective circuit impedances are the same and hence the differences between the respective groups are suppressed.

Embodiment 2

Figure 6:
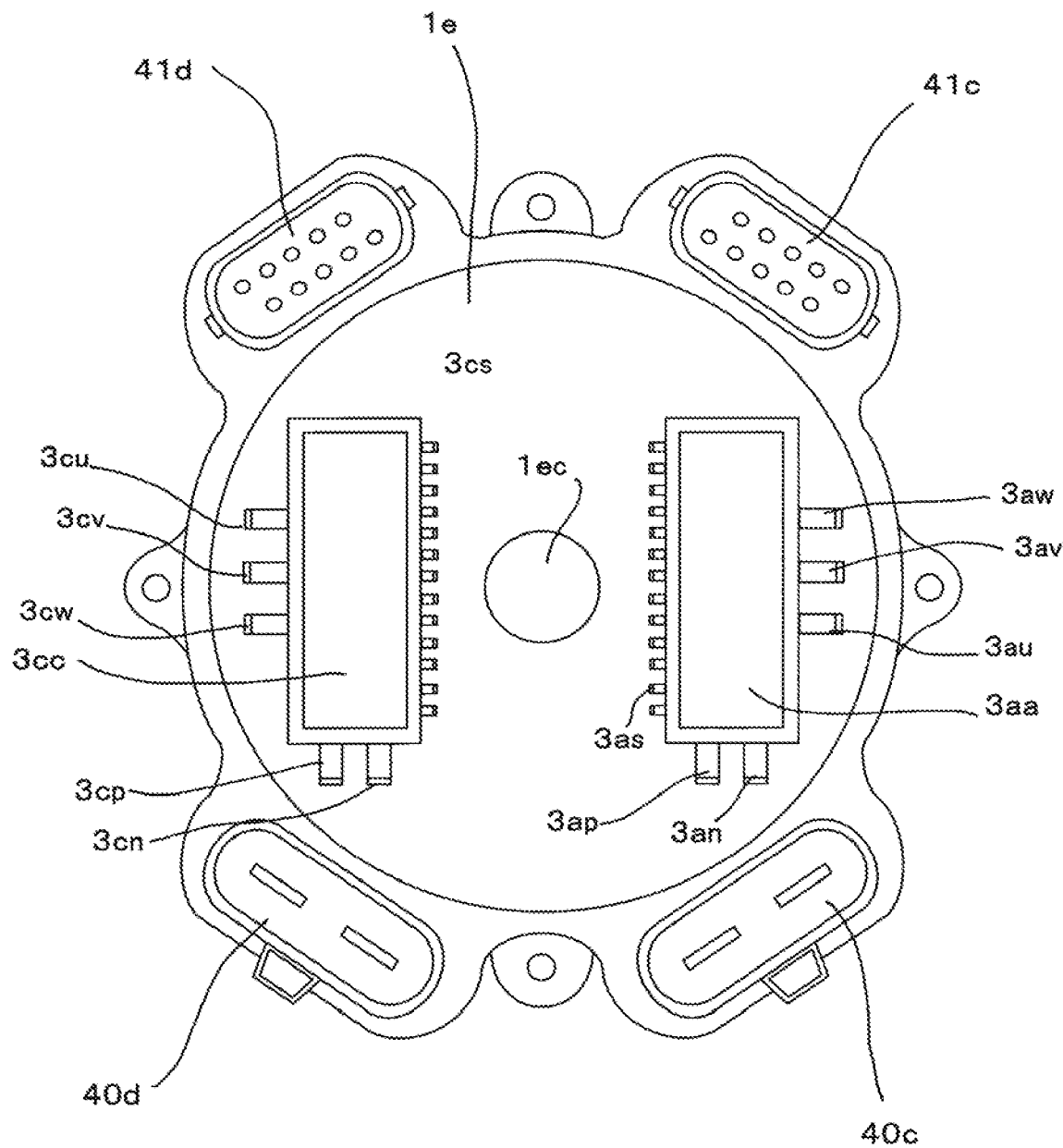
FIG. 6 is a plan view illustrating a wall surface portion of a housing and the periphery thereof in an electric power steering apparatus according to Embodiment 2.

Next, an electric power steering apparatus according to Embodiment 2 will be explained. FIG. 6 is a plan view illustrating a wall surface portion of a housing and the periphery thereof in the electric power steering apparatus according to Embodiment 2 and corresponds to FIG. 5 in foregoing Embodiment 1. The overall circuit diagram of the electric power steering apparatus according to Embodiment 2 is the same as FIG. 1. In FIG. 6, the first power module 3aa including the first inverter circuit 3a and the first power-supply relay 5a and a second power module 3cc including the second inverter circuit 3b and the second power-supply relay 5b are mounted on the inner wall surface, which is the bottom portion of a housing 1e.

The pulling-out positions of power-supply terminals 3cp and 3cn of the second power module 3cc are different from those of the power-supply terminals of the second power module 3bb in foregoing Embodiment 1. That is to say, in Embodiment 1, the power-supply terminals 3bp and 3bn are pulled out from the short side adjacent to the right end of the long side of the second power module 3bb, from which the second output terminals 3bu, 3bv, and 3bw illustrated in FIG. 5 are pulled out; however, in the second power module 3cc in Embodiment 2, the power-supply terminals 3cp and 3cn are pulled out from the short side adjacent to the left end of the long side of the second power module 3cc, from which the second output terminals 3cu, 3cv, and 3cw illustrated in FIG. 6 are pulled out.

The first power module 3aa and the second power module 3cc are arranged in line symmetry with respect to a virtual straight line (unillustrated) passing through the center axis of the penetration hole 1ec in the housing 1e, i.e., the center axis of the output shaft (unillustrated), of the motor 2, that penetrates the penetration hole 1ec.

A pair of a first power-supply connector 40c and a second power-supply connector 40d and a pair of a first signal connector 41c and a second signal connector 41d are arranged in line symmetry with respect to a virtual straight line (unillustrated) passing through the center axis of the penetration hole 1ec in the housing 1e, i.e., the center axis of the output shaft 21, of the motor 2, that penetrates the penetration hole 1ec. That is to say, the first signal connector 41c and the second signal connector 41d are arranged at one side (at the upper side, in FIG. 6) of the virtual straight line (unillustrated) passing through the center axis of the penetration hole 1ec, i.e., the center axis of the output shaft 21, of the motor 2, that penetrates the penetration hole 1ec; the first power-supply connector 40c and the second power-supply connector 40d are arranged at the other side (at the lower side, in FIG. 6) of the virtual straight line passing through the center axis of the penetration hole 1ec, i.e., the center axis of the output shaft 21, of the motor 2, that penetrates the penetration hole 1ec.

As is clear from FIG. 1, because the current that flows in the first power-supply connector 40c and the second power-supply connector 40d and the current that flows in the first signal connector 41c and the second signal connector 41d are completely different from each other, it is not required that the power-supply connector and the signal connector are adjacently arranged. Accordingly, in Embodiment 2, the power-supply connector and the signal connector are separately arranged. In this regard, however, because the vehicle-side connectors for the connection from the vehicle to the electric power steering apparatus are not separately pulled out, the first power-supply connector 40c and the second power-supply connector 40d are adjacently arranged, and the first signal connector 41c and the second signal connector 41d are adjacently arranged. It is also made possible that the first power-supply connector 40c and the first signal connector 41c are adjacently arranged and the second power-supply connector 40d and the second signal connector 41d are adjacently arranged.

The arrangement of the pair of the first power-supply connector 40c and the second power-supply connector 40d and the pair of the first signal connector 41c and the second signal connector 41d provides an effect to the arrangement of the pair of the first control circuit unit 4a and the second control circuit unit 4b and the relay member 28; as a result, the first power module 3aa and the second power module 3cc are arranged, as illustrated in FIG. 6. That is to say, the signal terminals 3as of the first power module 3aa and the second signal terminals 3*cs* of the second power module 3*cc* are arranged at the inner-diameter side of the housing 1*e*, as is the case with Embodiment 1; the first power-supply terminals 3*ap* and 3*an* of the first power module 3*aa* and the second power-supply terminals 3*cp* and 3*cn* of the second power module 3*cc* are arranged at the outer-diameter side of the housing 1*e*.

The first power-supply terminals 3*ap* and 3*an* of the first power module 3*aa* and the second power-supply terminals 3*cp* and 3*cn* of the second power module 3*cc* are arranged in the vicinity of the first power-supply connector 40*c* and the second power-supply connector 40*d*, respectively. As a result, although the respective circuit networks of the first power module 3*aa* and the second power module 3*cc* are one and the same and the respective integrated components thereof are one and the same, the first power-supply terminals 3*ap* and 3*an* of the first power module 3*aa* and the second power-supply terminals 3*cp* and 3*cn* of the second power module 3*cc* are arranged, as described above, in line symmetry with respect to a virtual straight line (unillustrated) passing through the center of the penetration hole 1*ec*, i.e., the center axis of the output shaft 21 that penetrates the penetration hole 1*ec*. As a result, although in Embodiment 1, two pieces of power modules belonging to one type can be utilized, there are required, in Embodiment 2, one piece each of different power modules belonging to two types, the respective circuits and the respective functions of which are one and the same, but the respective terminal arrangements of which are different from each other.

The first power-supply connector 40*c* and the second power-supply connector 40*d* are one and the same, and the first signal connector 41*c* and the second signal connector 41*d* are one and the same; however, the respective electric connections thereof are arranged in left-and-right line symmetry with respect to a virtual straight line (unillustrated) passing through the center of the penetration hole 1*ec*, i.e., the center axis of the output shaft 21 that penetrates the penetration hole 1*ec*. As is the case with Embodiment 1, the protruding direction of each of the connectors is the one toward the motor 2; however, it may be allowed that all of or at least one of the connectors protrude toward the anti-motor 2 side, i.e., the output side of the output shaft 21 of the motor 2.

As described above, because in Embodiment 2, the respective corresponding connectors are arranged substantially in line symmetry with respect to a virtual straight line passing through the center axis of the output shaft 21, the wiring for a current in each pair can methodically be performed to be in left-and-right symmetry; as a result, also in the control circuit and the relay member, the respective corresponding components and wiring leads can also be arranged in line symmetry; thus, downsizing can be realized.

Moreover, in Embodiment 2, the respective impedances of circuit-configuration pairs corresponding between the first power module 3*aa* including the first inverter circuit 3*a* and the second power module 3*cc* including the second inverter circuit 3*b* can be made to be one and the same; in addition to that, respective noise signals caused by supplying large currents to the motor 2 are not superimposed on each other, and the respective currents rather flow in opposite directions to cancel the noise signals; therefore, an effect of reducing the noise can be demonstrated.

Embodiment 3

Figure 7:
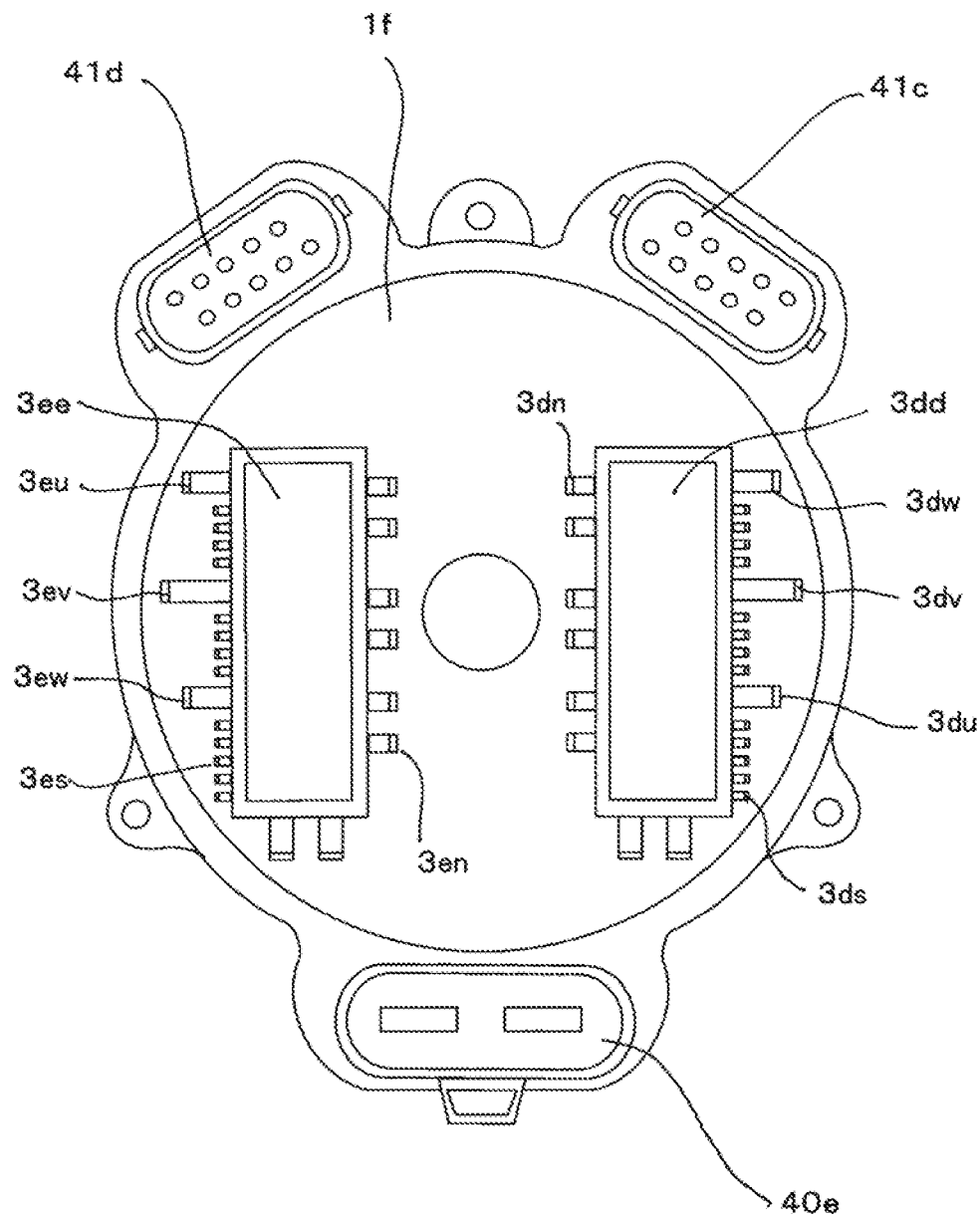
FIG. 7 is a plan view illustrating a wall surface portion of a housing and the periphery thereof in an electric power steering apparatus according to Embodiment 3.

Next, an electric power steering apparatus according to Embodiment 3 will be explained. FIG. 7 is a plan view illustrating a wall surface portion of a housing and the periphery thereof in the electric power steering apparatus according to Embodiment 3 and corresponds to FIG. 6 in Embodiment 2. A first power module 3*dd* including the first inverter circuit 3*a* and the first power-supply relay 5*a* and a second power module 3*ee* including the second inverter circuit 3*b* and the second power-supply relay 5*b* are mounted on the inner wall surface, as the bottom portion, of a housing 1*f*.

In Embodiment 3, only a single power-supply connector 40*e* is provided; the +B line of the battery 9 and the GND line of a vehicle are connected with the single power-supply connector 40*e*; after being inputted to the electric power steering apparatus 100, the pair of the +B line of the battery 9 and the GND line are divided into two pairs (unillustrated). Accordingly, the power-supply connector 40*e* is enlarged in comparison with each of the power-supply connectors in Embodiments 1 and 2. It may be allowed that a single housing for the power-supply connector and two pairs of power-supply terminal conductors are utilized, i.e. four power-supply terminal conductors are utilized.

The respective terminal arrangements of the first power module 3*dd* and the second power module 3*ee* are different from the respective corresponding terminal arrangements of Embodiments 1 and 2. In other words, first output terminals 3*du*, 3*dv*, and 3*dw*, for supplying currents to the motor 2, of the first power module 3*dd* are discretely arranged among two or more first signal terminals 3*ds*; second output terminals 3*eu*, 3*ev*, and 3*ew*, for supplying currents to the motor 2, of the second power module 3*ee* are discretely arranged among two or more second signal terminals 3*es*. That is to say, the output terminals and the signal terminals of each of the power modules are pulled out from one and the same side of the corresponding power module, i.e., one of the long sides thereof; the output terminals are discretely arranged in a row of the signal terminals.

The total number of provided conductors 3*dn* including the power supply lines and the GND lines pulled out from the other one of the long sides of the first power module 3*dd* is six for three phases. Similarly, the total number of provided conductors 3*en* including the power supply lines and the GND lines pulled out from the other one of the long sides of the second power module 3*ee* is six for three phases.

The six respective terminals 3*dn* of the first power module 3*dd* are connected with the U-phase noise suppression capacitor 30Ua, the V-phase noise suppression capacitor 30Va, and the W-phase noise suppression capacitor 30Wa in the first inverter circuit 3*a* mounted on the foregoing relay member 28. The six respective terminals 3*dn* of the second power module 3*ee* are connected with the U-phase noise suppression capacitor 30Ub, the V-phase noise suppression capacitor 30Vb, and the W-phase noise suppression capacitor 30Wb in the second inverter circuit 3*b* mounted on the foregoing relay member 28.

The other configurations are the same as those in Embodiment 2. In the electric power steering apparatus, configured in such a manner as described above, according to Embodiment 3, because the foregoing constituent elements are arranged in line symmetry with respect to a virtual straight line passing through the center axis of the output shaft of the motor, the respective wiring leads connected with the power-supply connector 40*e*, the first signal connector 41*c*, and the second signal connector 41*d* are arranged substantially in line symmetry; thus, the respective paths for supplying currents to the first power module 3*dd* and the second power module 3*ee* and further to the motor 2 through these wiring leads are substantially line-symmetric current flows.

As a result, the respective impedances of the pairs are substantially the same, and the directions of respective currents become one and the same; therefore, it is made possible to suppress noise and to realize downsizing.

Whether the point-symmetric-arrangement electric power steering apparatus according to Embodiment 1 or the line-symmetric-arrangement electric power steering apparatus according to any one of Embodiments 2 and 3 is to be adopted may be determined in consideration of the mountability for a vehicle, connection with the vehicle-side connector, and the like.

Although the present application is described above in terms of various exemplary embodiments and implementations, it should be understood that the various features, aspects and functions described in one or more of the individual embodiments are not limited in their applicability to the particular embodiment with which they are described, but instead can be applied, alone or in various combinations to one or more of the embodiments. Therefore, an infinite number of unexemplified variant examples are conceivable within the range of the technology disclosed in the present application. For example, there are included the case where at least one constituent element is modified, added, or omitted and the case where at least one constituent element is extracted and then combined with constituent elements of other embodiments.

INDUSTRIAL APPLICABILITY

The present disclosure can be applied to the field of an electric power steering apparatus to be utilized in a vehicle or to the field of vehicle sound.

DESCRIPTION OF REFERENCE NUMERALS

100: electric power steering apparatus
1: control unit
1a: first control unit
1b: second control unit
1c, 1e: housing
1c1: first housing extension portion
1c2: second housing extension portion
1c3a: first protruding portion
1c3b: second protruding portion
2: motor
2a: first armature winding
2b: second armature winding
3a: first inverter circuit
3b: second inverter circuit
4: control board
4a: first control circuit unit
4b: second control circuit unit
4c: penetration hole
5a: first power-supply relay
5b: second power-supply relay
6a: first filter
6b: second filter
7: ignition switch
8: sensors
9: battery
10a: first CPU
10b: second CPU
11a: first driving circuit
11b: second driving circuit
12a: first input circuit
12b: second input circuit
13a: first power-supply circuit
13b: second power-supply circuit
14: communication line
15, 16: supporting member
17: synchronized resolver
17a: first rotation sensor
17b: second rotation sensor
21: output shaft
22: rotor
23: stator
25: terminal portion
251: insulating plate
252, 253: connecting conductor
26a: first bearing
26b: second bearing
27: case
271: end wall portion
28: relay member
40a, 40c: first power-supply connector
40b, 40d: second power-supply connector
40a1, 40a2, 40b1, 40b2: power-supply terminal conductor
41a, 41c: first signal connector
41b, 41d: second signal connector
41a10, 41b10: signal terminal conductor
80: insulating case
80a: first insulating case extension portion
80b: second insulating case extension portion
90: adhesive
3aa, 3dd: first power module
3bb, 3cc, 3ee: second power module

The invention claimed is:

1. An electric power steering apparatus comprising:
a motor having a rotor fixed on an output shaft thereof and a stator;
a control unit for controlling the motor;
a control board; and
a housing covering the inside of the control unit, the housing including an insulating case and a metal housing,
wherein the motor and the control unit are arranged in parallel with each other in a direction in which the output shaft of the motor extends so as to be integrally fixed to each other,
wherein the motor has a first armature winding and a second armature winding,
wherein the control unit has a first control unit for controlling the first armature winding and a second control unit for controlling the second armature winding,
wherein at least part of constituent elements of the first control unit and at least part of constituent elements of the second control unit are arranged in a peripheral portion of the output shaft,
wherein the constituent elements of the first control unit and the constituent elements, of the second control unit, that correspond to the constituent elements of the first control unit are arranged in point symmetry with respect to a center axis of the output shaft or in line symmetry with respect to a virtual straight line perpendicular to the direction in which the output shaft extends, and
wherein pairs of the constituent elements of the first control unit and the constituent elements of the second control unit comprise each of a pair of inverter circuits, a pair of CPUs, and a pair of driving circuits,
wherein the pair of driving circuits and the pair of CPUs are arranged on a face of the control board, wherein the pair of inverter circuits are arranged on a face of the metal housing, and wherein the face of the control board and the face of the metal housing face a same direction.

2. The electric power steering apparatus according to claim 1, further comprising two or more power-supply connectors for supplying a power source to the control unit and two or more signal connectors for supplying a control signal to the control unit, wherein the two or more power-supply connectors are arranged in point symmetry with the center axis of the output shaft or in line symmetry with respect to a virtual straight line perpendicular to the direction in which the output shaft extends.

3. The electric power steering apparatus according to claim 2, wherein the control board has a plane extending in a direction perpendicular to the direction in which the output shaft extends, and wherein the CPU of the first control unit and the CPU of the second control unit are arranged in point symmetry with respect to the center axis of the output shaft or in line symmetry with respect to a virtual straight line perpendicular to the direction in which the output shaft extends.

4. The electric power steering apparatus according to claim 2, wherein the control unit includes a first power module having a first inverter circuit of the pair of inverter circuits as part of the constituent elements of the first control unit, and a second power module having a second inverter circuit of the pair of inverter circuits as part of the constituent elements of the second control unit, and wherein the first power module and the second power module are mounted on the face of the metal housing, that is perpendicular to the direction in which the output shaft extends, and are arranged in point symmetry with respect to the center axis of the output shaft or in line symmetry with respect to a virtual straight line perpendicular to the direction in which the output shaft extends.

5. The electric power steering apparatus according to claim 4, wherein the control unit has a power-supply connector, wherein the first power module has an output terminal to be connected with the first armature winding of the motor and a power-supply terminal to be connected with an external power source, wherein the second power module has an output terminal to be connected with the second armature winding of the motor and a power-supply terminal to be connected with an external power source, wherein the respective output terminals of the first power module and the second power module are arranged at the outer-diameter side of the control unit, and wherein the respective power-supply terminals of the first power module and the second power module are arranged in the vicinity of the power-supply connector.

6. The electric power steering apparatus according to claim 2, wherein the
control board has a plane extending in a direction perpendicular to the direction in which the output shaft extends, wherein the control unit includes a first power module having a first inverter circuit of the pair of inverter circuits as part of the constituent elements of the first control unit, and a second power module having a second inverter circuit of the pair of inverter circuits as part of the constituent elements of the second control unit, wherein the CPU of the first control unit and the CPU of the second control unit are arranged in point symmetry with respect to the center axis of the output shaft or in line symmetry with respect to a virtual straight line perpendicular to the direction in which the output shaft extends, wherein the first power module and the second power module are mounted on the face of the metal housing, that is perpendicular to the direction in which the output shaft extends, and are arranged in point symmetry with respect to the center axis of the output shaft or in line symmetry with respect to a virtual straight line perpendicular to the direction in which the output shaft extends, and wherein the control board and the wall surface of the housing are arranged in parallel with each other in the direction in which the output shaft extends.

7. The electric power steering apparatus according to claim 6, wherein the control unit has a power-supply connector, wherein the first power module has an output terminal to be connected with the first armature winding of the motor and a power-supply terminal to be connected with an external power source, wherein the second power module has an output terminal to be connected with the second armature winding of the motor and a power-supply terminal to be connected with an external power source, wherein the respective output terminals of the first power module and the second power module are arranged at the outer-diameter side of the control unit, and wherein the respective power-supply terminals of the first power module and the second power module are arranged in the vicinity of the power-supply connector.

8. The electric power steering apparatus according to claim 1, further comprising two or more power-supply connectors for supplying a power source to the control unit and two or more signal connectors for supplying a control signal to the control unit.

9. The electric power steering apparatus according to claim 8, wherein the control board has a plane extending in a direction perpendicular to the direction in which the output shaft extends, and wherein the CPU of the first control unit and the CPU of the second control unit are arranged in point symmetry with respect to the center axis of the output shaft or in line symmetry with respect to a virtual straight line perpendicular to the direction in which the output shaft extends.

10. The electric power steering apparatus according to claim 8, wherein the control unit includes a first power module having a first inverter circuit of the pair of inverter circuits as part of the constituent elements of the first control unit, and a second power module having a second inverter circuit of the pair of inverter circuits as part of the constituent elements of the second control unit, and wherein the first power module and the second power module are mounted on the face of the metal housing, that is perpendicular to the direction in which the output shaft extends, and are arranged in point symmetry with respect to the center axis of the output shaft or in line symmetry with respect to a virtual straight line perpendicular to the direction in which the output shaft extends.

11. The electric power steering apparatus according to claim 10,
wherein the control unit has a power-supply connector,
wherein the first power module has an output terminal to be connected with the first armature winding of the motor and a power-supply terminal to be connected with an external power source,
wherein the second power module has an output terminal to be connected with the second armature winding of the motor and a power-supply terminal to be connected with an external power source,
wherein the respective output terminals of the first power module and the second power module are arranged at the outer-diameter side of the control unit, and
wherein the respective power-supply terminals of the first power module and the second power module are arranged in the vicinity of the power-supply connector.

12. The electric power steering apparatus according to claim 8,
wherein the
control board has a plane extending in a direction perpendicular to the direction in which the output shaft extends,
wherein the control unit includes
a first power module having a first inverter circuit of the pair of inverter circuits as part of the constituent elements of the first control unit, and
a second power module having a second inverter circuit of the pair of inverter circuits as part of the constituent elements of the second control unit, and
wherein the CPU of the first control unit and the CPU of the second control unit are arranged in point symmetry with respect to the center axis of the output shaft or in line symmetry with respect to a virtual straight line perpendicular to the direction in which the output shaft extends,
wherein the first power module and the second power module are mounted on the face of the metal housing, that is perpendicular to the direction in which the output shaft extends, and are arranged in point symmetry with respect to the center axis of the output shaft or in line symmetry with respect to a virtual straight line perpendicular to the direction in which the output shaft extends, and
wherein the control board and the wall surface of the housing are arranged in parallel with each other in the direction in which the output shaft extends.

13. The electric power steering apparatus according to claim 1,
wherein the control board has a plane extending in a direction perpendicular to the direction in which the output shaft extends, and
wherein the CPU of the first control unit and the CPU of the second control unit are arranged in point symmetry with respect to the center axis of the output shaft or in line symmetry with respect to a virtual straight line perpendicular to the direction in which the output shaft extends.

14. The electric power steering apparatus according to claim 1,
wherein the control unit includes
a first power module having a first inverter circuit of the pair of inverter circuits as part of the constituent elements of the first control unit, and
a second power module having a second inverter circuit of the pair of inverter circuits as part of the constituent elements of the second control unit, and
wherein the first power module and the second power module are mounted on the face of the metal housing, that is perpendicular to the direction in which the output shaft extends, and are arranged in point symmetry with respect to the center axis of the output shaft or in line symmetry with respect to a virtual straight line perpendicular to the direction in which the output shaft extends.

15. The electric power steering apparatus according to claim 14,
wherein the control unit has a power-supply connector,
wherein the first power module has an output terminal to be connected with the first armature winding of the motor and a power-supply terminal to be connected with an external power source,
wherein the second power module has an output terminal to be connected with the second armature winding of the motor and a power-supply terminal to be connected with an external power source,
wherein the respective output terminals of the first power module and the second power module are arranged at the outer-diameter side of the control unit, and
wherein the respective power-supply terminals of the first power module and the second power module are arranged in the vicinity of the power-supply connector.

16. The electric power steering apparatus according to claim 1,
wherein the
control board has a plane extending in a direction perpendicular to the direction in which the output shaft extends,
wherein the control unit includes
a first power module having a first inverter circuit of the pair of inverter circuits as part of the constituent elements of the first control unit, and
a second power module having a second inverter circuit of the pair of inverter circuits as part of the constituent elements of the second control unit, and
wherein the CPU of the first control unit and the CPU of the second control unit are arranged in point symmetry with respect to the center axis of the output shaft or in line symmetry with respect to a virtual straight line perpendicular to the direction in which the output shaft extends,
wherein the first power module and the second power module are mounted on the face of the metal housing, that is perpendicular to the direction in which the output shaft extends, and are arranged in point symmetry with respect to the center axis of the output shaft or in line symmetry with respect to a virtual straight line perpendicular to the direction in which the output shaft extends, and
wherein the control board and the wall surface of the housing are arranged in parallel with each other in the direction in which the output shaft extends.

17. The electric power steering apparatus according to claim 16,
wherein the control unit has a power-supply connector,
wherein the first power module has an output terminal to be connected with the first armature winding of the motor and a power-supply terminal to be connected with an external power source, wherein the second power module has an output terminal to be connected with the second armature winding of the motor and a power-supply terminal to be connected with an external power source, wherein the respective output terminals of the first power module and the second power module are arranged at the outer-diameter side of the control unit, and wherein the respective power-supply terminals of the first power module and the second power module are arranged in the vicinity of the power-supply connector.

18. The electric power steering apparatus according to claim 1, wherein the control unit includes a relay member having a plane extending in a direction perpendicular to the direction in which the output shaft extends, wherein at least one of a filter and a capacitor as part of the constituent elements of the first control unit and at least one of a filter and a capacitor as part of the constituent elements of the second control unit are mounted on the plane of the relay member, and wherein the filter or the capacitor of the first control unit and the filter or the capacitor of the second control unit are arranged in point symmetry with respect to the center axis of the output shaft or in line symmetry with respect to a virtual straight line perpendicular to the direction in which the output shaft extends.

19. The electric power steering apparatus according to claim 1, wherein the control unit is disposed at the output side of the output shaft with respect to the motor.

20. The electric power steering apparatus according to claim 1, wherein the pair of driving circuits and the pair of CPUs are protruded in a first direction from the face of the control board, wherein the pair of inverter circuits are protruded in a second direction from the face of the metal housing, wherein the first direction is the same direction as the second direction, and wherein the first direction and the second direction are both parallel to a longitudinal axis of the output shaft.

* * * * *